Figure 1:
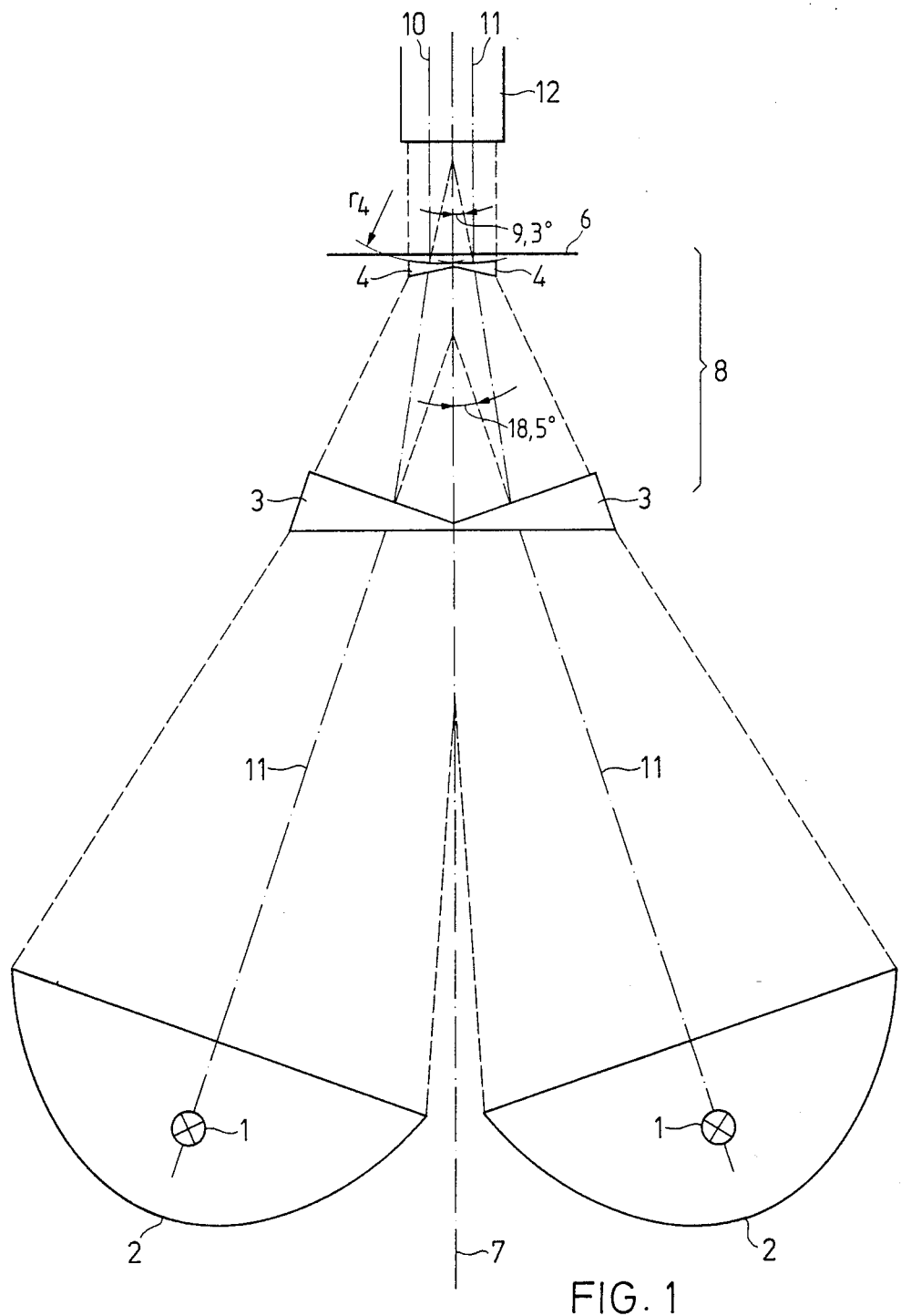

United States Patent [19]

Meier et al.

[11] Patent Number: 4,555,168

[45] Date of Patent: Nov. 26, 1985

[54] DEVICE FOR PROJECTING STEROSCOPIC, ANAMORPHOTICALLY COMPRESSED PAIRS OF IMAGES ON TO A SPHERICALLY CURVED WIDE-SCREEN SURFACE

[75] Inventors: Walter Meier, Birmensdorf, Switzerland; Jan Jacobsen, Reutern, Fed. Rep. of Germany

[73] Assignee: Walter Meier, Switzerland

[21] Appl. No.: 488,540

[22] PCT Filed: Aug. 23, 1982

[86] PCT No.: PCT/CH82/00099
§ 371 Date: Apr. 8, 1983
§ 102(e) Date: Apr. 8, 1983

[87] PCT Pub. No.: WO83/00749
PCT Pub. Date: Mar. 3, 1983

[30] Foreign Application Priority Data

Aug. 24, 1981 [CH] Switzerland .......................... 5452/81
Sep. 23, 1981 [CH] Switzerland .......................... 6177/81
Aug. 5, 1982 [CH] Switzerland .......................... 4725/82

[51] Int. Cl.[4] ............................................ G03B 21/00
[52] U.S. Cl. ........................................................ 353/7
[58] Field of Search ........................................ 353/7-9, 353/81; 352/57, 58, 62, 68

[56] References Cited

U.S. PATENT DOCUMENTS 2,307,981 1/1943 Babcock et al. .................. 352/57 X
2,810,323 10/1957 Coleman .
3,425,775 2/1969 Jacobsen .

FOREIGN PATENT DOCUMENTS 980750 12/1975 Canada .
398746 6/1909 France .
807183 10/1936 France .................................... 353/7
1108831 1/1956 France .

Primary Examiner—Harry N. Haroian
Attorney, Agent, or Firm—Roylance, Abrams, Berdo and Goodman

[57] ABSTRACT

The optical device comprises a lighting unit with two light sources (1) with reflectors (2), whose optical axes (11) are inclined towards one another, with prism pairs (3, 4) for forming two parallel image channels (10, 11) arranged in the optical path and a supplementary lens arranged after a basic optical (12) of a commercial projector for the lateral expansion of the linearly compressed individual images and lenses (A, B, C) for the distortion-free superwide angle imaging of the image pairs on a spherically curved surface. By means of this optical device, a normal commercially available cine projector can be upgraded to a projection apparatus for stereoscopic, linear anamorphotically compressed image pairs on an extremely large, spherically curved wide-screen surface.

18 Claims, 2 Drawing Figures

DEVICE FOR PROJECTING STEROSCOPIC, ANAMORPHOTICALLY COMPRESSED PAIRS OF IMAGES ON TO A SPHERICALLY CURVED WIDE-SCREEN SURFACE

The invention is in the field of optical image formation and relates to a device for projecting stereoscopic, linear anamorphotically compressed pairs of images on to a double-curved, particularly spherical wide-screen surface, comprising a lighting unit acting on the image plane of a projector, a basic lens arranged in the beam following the image plane and associated with the projector and a supplementary lens cooperating with the lighting unit.

When showing films attempts have frequently been made to give the viewer the impression that he is taking part in the photographically represented events. The attractiveness of the realistic representation of a usually optically dramatic sequence, such as e.g. objects flying towards the viewer and precipitous journeys, which give rise to many different reactions on the part of the viewer, have led to numerous technical solutions in this field.

Thus, U.S. Pat. No. 4,129,365 describes a wide-angle projection arrangement, in which a picture formed from three images is projected on to a cylindrically curved projection surface in order to offer the viewer a panoramic effect. Through the use of a special type of flexible mirror, projection can take place without any disturbing view of the projection machines, which are positioned somewhat below and in front of the viewer. The necessary aspect ratio of the partial images is produced with the aid of anamorphotically acting, optical means. The apparatus expenditure, namely three cameras and in each case two, i.e. six reflecting mirrors in all is considerable. Special measures are also required for a jointless transition of the partial images.

Much less expenditure is required by the projection device described e.g. in U.S. Pat. No. 4,154,514, by means of which an image can be produced on a projection plane which has a pronounced arcuate curvature on one side and as a result the viewer is given the impression of a three-dimensional effect. Projection takes place over an angle between 138° and 153° on to a cylindrically curved plane. Compared with conventional three D-systems, under an angle usually smaller than 90°, no additional optical viewing aid is required for producing the three-dimensional effect. The projection arrangement described in this specification merely consists of a single projection apparatus with upstream-connected, anamorphotic aids, in order to produce the necessary enormous width/height ratio. 35 mm standard films with anamorphotic images are used for projection purposes.

The impression of the optical three-dimensional effect is largely based on the pronounced curvature of the projection plane, which surrounds the viewer of the photographic scene or occupies the field of view of the eye to the extent that the image frame is no longer perceived. Thus, it is not a picture in the manner that it is perceived by both eyes with the given interoccular spacing and is processed to a three-dimensional image in the brain.

Another technical solution is known in which two anamorphotically compressed images, correlated to one another with an interoccular spacing are imaged on a 70 mm standard film in a ratio of 1:2. On projection, this leads to a stereo wide-screen picture with two images correlated with the interoccular spacing and also having different polarizations. Viewing takes place by means of a viewing aid, namely spectacles or glasses with two polarizers sloping towards one another.

For taking the pictures, two basic optics are connected upstream of in each case one anomorphotic lens, whose optical axes essentially have the average spacing of a pair of human eyes. Since on the film, the centre-to-centre distance of the photograph is determined by its size and is generally considerably smaller, the imaged object distances are adapted in known manner by reflecting mirrors. As a function of the conventional anamorphotic lens/basic optics combination, this requires relatively large overall length and consequently a limitation of the camera angle. The convergence control of the two correlated images is also made difficult in the case of the saught extreme wide-angle projection. The incident light beams of the two optics must be displaced transversely to the optical axis and at the same time focused, as soon as the camera distance changes.

In the case of all these projections on to oversize projection surfaces, there is the additional advantage of a very low light yield from the lighting unit. This is largely linked with the filters, which are arranged in the lens of such a projection apparatus and the polarization filters of the glasses worn by each viewer, in which approximately half of the light yield per polarization channel is lost. In addition, the projection surfaces are extremely large, so that image illumination is no longer particularly good. For a considerable time efforts have been made to overcome this disadvantage by more powerful light fittings. However, it is disadvantageous in this case that the illumination of a stereoscopic pair of images in the film plane also leads to light losses.

The problem of the invention, in connection with the reproduction of wide-angle stereo images, in which simultaneously anamorphotic decompression takes place, is to provide an optical arrangement, which has small overall lengths, few movable parts and which has a sufficiently high light intensity for image formation. Another problem of the invention is to provide an optical arrangement, which is suitable for projecting stereoscopic image pairs on to a spherical projection surface. Yet a further problem of the invention is to so equip an optical device, that it can be arranged on the mechanism and basic optics of normal commercially available projectors.

This problem is solved by the invention defined in the claims.

The invention is now described relative to the embodiment represented in the two drawings, wherein show:

FIG. 1 the apparatus for illuminating stereoscopic pairs of images.

Figure 2:
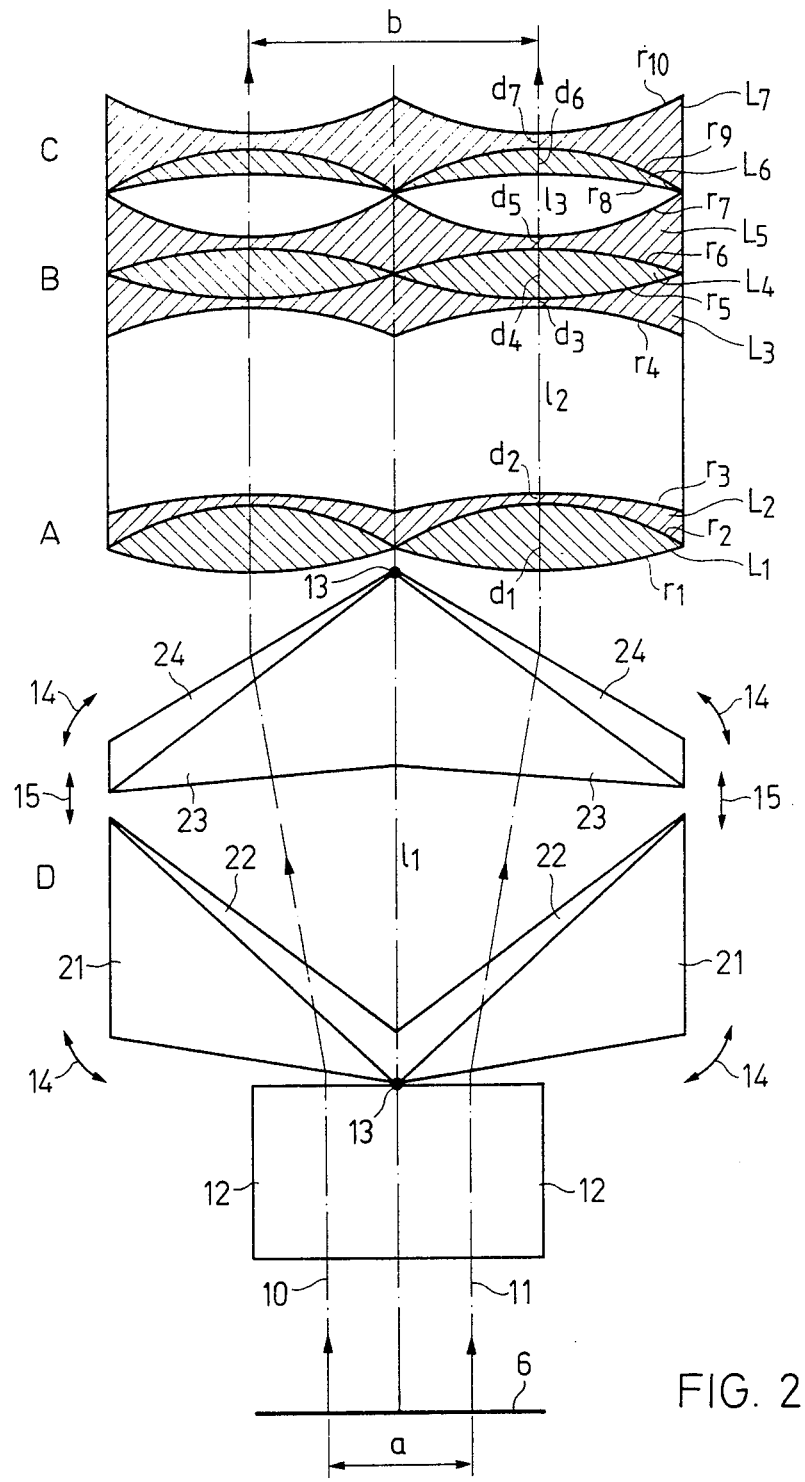

FIG. 2 the supplementary lens for projecting stereoscopic pairs on to a spherical wide-screen surface.

As stated hereinbefore, by means of this device, a normal, commercially available cine projector can be upgraded into a projection apparatus for stereoscopic, linear anamorphotically compressed pairs of images on extremely large, spherically curved wide-screen surfaces. The problem is to supply the energy in the visible spectrum from the light sources as quantitatively as possible to the film trap and finally to anamorphotically laterally expand the transmitted image pairs and project them on to the oversize screen with an adequate light intensity, i.e. said screen is fully illuminated.

FIG. 1 shows in plan view the lighting unit for illuminating the stereoscopic pairs of images. This unit comprises two Xenon high pressure arc lamps, e.g. in each case with an output of 4 kW. Each of these arc lamps is surrounded by ellipsoidal mirror 2 in such a way that the light beams, as indicated by broken lines, pass in the direction of optical axis 11 to the first reflecting prism 3. Each of the ellipsoidal mirrors has focal lengths of substantially 60 and 540 mm. The diameter of the mirror at its edge is approximately 280 mm. It can also be seen that arc lamps 1 and mirrors 2 are arranged symmetrically to a plane of symmetry 7. The angle between plane of symmetry 7 and optical axes 11 is in the present case 18.5°. It is obvious that, as a function of the spatial dimensions of an embodiment, the angle can differ from the given angular value. The first reflecting prism can be made from quartz with a refractive angle of 19.56° or from the material "ZK N7" with a refractive angle of 17.5°. When made from quartz, the refractive index for the helium line $n_d = 1.458$ and the Abbe number $\nu_d = $ approximately 67. When made from "ZK N7", the refractive index for the helium line $n_d = 1.5085$ and the Abbe number $\nu_d = 61.19$. A first deflecting prism 3 is provided for each of the optical axes. The optical axis direction is consequently deflected by an angle of 9.3° to the plane of symmetry 7, which is shown in broken line form in the drawing. The light passes in closely concentrated manner into area 8, which can e.g. contain the mechanical diaphragms of the film projector. At the end of area 8 there is a second deflecting prism 4, one of which is provided for each of the optical axes. This prism can either be made from quartz with a refractive index $n_d = 1.458$ and Abbe number $\nu_d = 67$ or from the material "Tempax" with the reflective index $n_d = 1.485$ and $\nu_d = $ approximately 62. In the second "Tempax" reflecting prism 4 with a refracting angle of 18.2°, the optical illumination axis is directed parallel to the plane of symmetry immediately in front of film plane 6. The light cone is extended by a spherical concave ground glass in the second deflecting prism, said glass being fitted to the side of the second prism 4, directed towards the projection optics 12. The radius of the ground glass is in the present case $r_4 = 146$ mm. The optical radius is a function of the arc lamp 1 used. The stereoscopic pair of images is completely illuminated in an optimum manner in film plane 6 and illumination losses no longer occur.

FIG. 2 shows in a partial sectional representation the supplementary lens arranged after the basic optics and which optically cooperates with the lighting unit according to the invention.

The stereoscopic pair of images 10, 11 is recorded on the film passing through image plane 6. Conventionally such films have a width of 35 or 70 mm. The centre-to-centre distance a of the two images 10, 11 is typically either 13 mm or 26 mm. As has been described, the lighting unit according to FIG. 1 is arranged behind the film. In the drawing, the optical axes of the two images 10, 11 are shown by dot-dash lines. For each image a so-called basic lens 12 is provided for projection, said lens can be considered as belonging to the camera in question. Each basic lens 12 is followed by a first pair of prisms 21, 22, which can be made from various optical materials and have the represented shape. The two partial prisms 21, 22 are cemented together. As a result the optical axis of the light beams is deflected to the right and left for anamorphotically decompressing the stereoscopic image paths. In the direction of the light beams, there now follows a second pair of prisms, comprising partial prisms 23, 24, which have the same or similar shape and operation to the first pair of prisms. The second pair of prisms 23, 24 is at a distance $l_1$ from the first pair of prisms 21, 22. This distance can either be lengthened or shortened, as is indicated by double arrow 15. The mechanisms for bringing about such a reciprocal displacement of the prism pairs are generally known and will not be discussed here. Distance b can be increased or decreased as a result of the change in distance $l_1$ between the prism pairs. This is dependent on the constructional width of the following lens elements A, B, C. The prism pairs 21, 22 and 23, 24 can also be pivoted in the corresponding fulcrum 13. As a result of this pivoting, which is indicated by the double arrows 14, the convergence of the stereo images projected on to the spherical projection screen can be adjusted in such a way that they offer the best stereo action without giving a disturbing optical impression.

The upper prism pairs 23, 24 of FIG. 2 is followed by an arrangement of three lens elements A, B, C for each of the two stereo images 10, 11. These lens elements have the same values for each image or for each image or picture channel. Thus, the reference numerals of the different constructional features of the lens elements are only shown for the right-hand arrangement. The following description and table also apply to the left-hand arrangement. The first element is positive and comprises a biconvex lens $L_1$ and a concave/convex lens $L_2$, which is followed by an air clearance with spacing $l_2$. The second element B has a negative action and comprises a biconcave lens $L_3$, biconvex $L_4$ and biconcave lens $L_5$. The third lens element C is separated by an air clearance $l_3$ from the second lens element B. The third lens element has a negative optical path and comprises a menicus lens $L_6$ and a biconcave lens $L_7$, followed by the not shown, known polarization filters. The stereo image pair is projected with the base distance b on to the spherical projection surface, which is in the form of a hemisphere.

There now follows the Table of constructional data of the represented lens:

|  |  |  |  | $n_d$ | d |
|---|---|---|---|---|---|
| Partial prism 1 | | | | 1.622801 | 56.90 |
| Partial prism 2 | | | | 1.620040 | 36.37 |
| total refractive angle 14° | | | | | |
| Partial prism 3 | | | | 1.622801 | 56.90 |
| Partial prism 4 | | | | 1.620040 | 36.37 |
| total refractive angle 17° | | | | | |
| A | $L_1$ | $r_1 = +89.05$ | $d_1 = 18$ | 1.620411 | 60.23 |
|  | $L_2$ | $r_2 = -80.50$ | $d_2 = 2.3$ | 1.755201 | 27.58 |
|  |  | $r_3 = -260.5$ | $l_2 = 31$ | | |
|  |  | $r_4 = -90$ | | | |
| B | $L_3$ | | $d_3 = 3$ | 1.620411 | 60.23 |
|  | $L_4$ | $r_5 = +154$ | $d_4 = 13$ | 1.755201 | 27.58 |
|  | $L_5$ | $r_6 = -154$ | $d_5 = 3$ | 1.620411 | 60.23 |
|  |  | $r_7 = +72$ | $l_3 = 19$ | | |

|  |  |  |  | $n_d$ | $\nu_d$ |
|---|---|---|---|---|---|
| C | $L_6$ | $r_8 = -190$ | $d_6 = 6$ | 1.755201 | 27.58 |
|  | $L_7$ | $r_9 = -86$ | $d_7 = 3$ | 1.620411 | 60.23 |
|  |  | $r_{10} = +178$ | | | |

In this table, r stands for the radii and d the thicknesses of the individual lenses in mm. The thicknesses 1 of the air clearances are also given in mm. The refractive index $n_d$ relates to the helium line and $\nu_d$ indicates the Abbe number.

We claim:

1. An optical device for projecting stereoscopic, linear anamorphotically compressed pairs of images on to a spherically curved wide-screen surface, comprising:
    a lighting unit including separate first and second light sources for first and second optical paths of separate first and second image channels, respectively, said light sources having two high pressure arc lamps surrounded by ellipsoidal mirrors, said ellipsoidal mirrors having optical axes at a predetermined angle relative to a plane of symmetry and defining optical illumination axes, and said lighting unit also including first and second deflecting prisms for displacing the illumination axes in directions parallel to said plane of symmetry;
    two projection basic lens systems positioned in said optical paths of said lighting unit;
    a film plane in said optical paths between said lighting unit and said basic lens systems; and
    two supplementary lens systems, in said optical paths on a side of said basic lens systems remote from said lighting unit, for determining said optical paths of each of said image channels, said supplementary lens systems including decompression means for anamorphotically decompressing stereoscopic image paths and including a focal lens means for distortion-free superwide angle imaging of the image pairs displaced by a base distance on a spherically curved surface.

2. An optical device according to claim 1 wherein each of said ellipsoidal mirrors has large and small focal lengths, the ratio between said focal lengths being about 1:9.

3. An optical device according to claim 1 wherein said first and second deflecting prisms are separated by a space for receiving projector diaphragms means for showing films.

4. An optical device according to claim 1 wherein said second deflecting prism comprises a spherically ground lens on a side thereof adjacent said basic lens system.

5. An optical device according to claim 4 wherein said first deflecting prism is selected from the group consisting of a quartz prism with a refractive index $n_d = 1.458$, and an Abbe number $\nu_d =$ approximately 67, and a ZK N7 prism with a refractive index $n_d = 1.5058$ and an Abbe number $\nu_d = 61.19$; and
    said second deflecting prism is selected from the group consisting of a quartz prism with a refractive index $n_d = 1.458$ and an Abbe number $\nu_d =$ approximately 67, and a Tempax prism with a refractive index $n_d = 1.485$ and an Abbe number $\nu_d =$ approximately 62, said spherically ground lens having a radius $r_4 = 146$ mm.

6. An optical device according to claim 1 wherein said first deflecting prism is selected from the group consisting of a quartz prism with a refractive index $n_d = 1.458$, and an Abbe number $\nu_d =$ approximately 67, and a ZK N7 prism with a refractive index $n_d = 1.5085$ and an Abbe number $\nu_d = 61.19$; and
    said second deflecting prism is selected from the group consisting of a quartz prism with a refractive index $n_d = 1.458$ and an Abbe number $\nu_d =$ approximately 67, and a Tempax prism with a refractive index $n_d = 1.485$ and an Abbe number $\nu_d =$ approximately 62.

7. An optical device according to claim 1 wherein said supplementary lens system comprises
    a first positive lens element including two lenses fixedly coupled together and being biconvex and concave/convex in light passage order;
    a second negative lens element including three lenses fixedly coupled together and being biconcave, biconvex and biconcave in light passage order; and
    a third negative lens element including a meniscus lens and a lens being concave/convex and biconcave in light passage order.

8. An optical device according to claim 7 wherein
    one lens of said first positive lens element has $r_1 = +89.05$, $r_2 = -80.50$, $d_1 = 18$, $n_d = 1.620411$ and $\nu_d = 60.23$;
    the other lens of said first positive lens element has $r_3 = -260.50$, $d_2 = 2.3$, $n_d = 1.755201$, $\nu_d = 27.58$ and $l_2 = 31$;
    a first lens of said second negative lens element has $r_4 = -90$, $r_5 = +154$, $d_3 = 3$, $n_d = 1.620411$ and $\nu_d = 60.23$;
    a second lens of said second negative lens element has $r_6 = -154$, $d_4 = 13$, $n_d = 1.755201$ and $\nu_d = 27.58$;
    a third lens of said second negative lens element has $r_7 = +72$, $d_5 = 3$, $n_d = 1.620411$, $\nu_d = 60.23$ and $l_3 = 19$;
    said meniscus lens of said third negative lens element has $r_8 = -190$, $r_9 = 86$, $d_6 = 6$, $n_d = 1.755201$ and $\nu_d = 27.58$; and
    the other lens of said third negative lens element has $r_{10} = +178$, $d_7 = 3$, $n_d = 1.620411$ and $\nu_d = 60.23$; in which
    $r_1$, $r_2$, $r_3$, $r_4$, $r_5$, $r_6$, $r_7$, $r_8$, $r_9$ and $r_{10}$ are radii of the respective lens measured in millimeters,
    $d_1$, $d_2$, $d_3$, $d_4$, $d_5$, $d_6$ and $d_7$ are lens thicknesses in millimeters,
    $n_d$ is refractive index,
    $\nu_d$ is an Abbe number,
    $l_2$ is spacing between said first positive lens element and said second negative lens element in millimeters, and
    $l_3$ is spacing between said second negative lens element and said third negative lens element in millimeters.

9. An optical device according to claim 1 wherein each of said ellipsoidal mirrors has focal lengths of about 60 mm and about 540 mm, and an edge diameter of about 280 mm.

10. An optical device according to claim 1 wherein said supplemental lens systems comprises first and second pairs of prisms separated by a variable distance, at least one of said pairs being pivotable about a fulcrum.

11. An optical device according to claim 10 wherein said first prism pair is achromatic, has a refracting angle of 14°, and comprises first and second, fixedly connected partial prisms, said first partial prism having a refractive index $n_d = 1.622801$ and an Abbe number $\nu_d = 56.90$, said second partial prism having a refractive index $n_d = 1.620040$ and an Abbe number $\nu_d = 36.37$; and
    said second prism pair is achromatic, has a refracting angle of 17° and comprises third and fourth, fixedly connected partial prisms, said third partial prism having a refractive index $n_d = 1.622801$ and an Abbe number $v_d = 56.90$, said fourth partial prism having a refracting index $n_d = 1.620040$ and an Abbe number $v_d = 36.37$.

12. An optical device for projecting stereoscopic, linear anamorphotically compressed pairs of images on to a spherically curved wide-screen surface, comprising:
- a lighting unit including separate first and second light sources for first and second optical paths of separate first and second image channels, respectively;
- a projection basic lens system positioned in said optical paths of said lighting unit;
- a film plane in said optical paths between said lighting unit and said basic lens system; and
- a supplementary lens system, in said optical paths on a side of said basic lens system remote from said lighting unit, for determining said optical paths of each of said image channels, said supplementary lens system including decompression means for anamorphotically decompressing stereoscopic image paths and including lens means for distortion-free superwide angle imaging of the image pairs displaced by a base distance on a spherically curved surface, said supplemental lens system including
  - first and second prism pairs separated by a variable distance, at least one of said prism pairs being pivotable about a fulcrum,
  - a first positive lens element including two lenses fixedly coupled together and being biconvex and concave/convex in light passage order,
  - a second negative lens element including three lenses fixedly coupled together and being biconcave, biconvex and biconcave in light passage order, and
  - a third negative lens element including a meniscus lens and a lens being concave/convex and biconcave in light passage order.

13. An optical device according to claim 12 wherein
said first prism pair is achromatic, has a refracting angle of 14°, and comprises first and second, fixedly connected partial prisms, said first partial prism having a refractive index $n_d = 1.622801$ and an Abbe number $v_d = 56.90$, said second partial prism having a refractive index $n_d = 1.620040$ and an Abbe number $v_d = 36.37$; and
said second prism pair is achromatic, has a refracting angle of 17° and comprises third and fourth, fixedly connected partial prisms, said third partial prism having a refractive index $n_d = 1.622801$ and an Abbe number $v_d = 56.90$, said fourth partial prism having a refracting index $n_d = 1.620040$ and an Abbe number $v_d = 36.37$.

14. An optical device according to claim 12 wherein
one lens of said first positive lens element has $r_1 = +89.05$, $r_2 = 80.50$, $d_1 = 18$, $n_d = 1.620411$ and $v_d = 60.23$;
the other lens of said first positive lens element has $r_3 = -260.50$, $d_2 = 2.3$, $n_d = 1.755201$, $v_d = 27.58$ and $l_2 = 31$;
a first lens of said second negative lens element has $r_4 = -90$, $r_5 = +154$, $d_3 = 3$, $n_d = 1.620411$ and $v_d = 60.23$;
a second lens of said second negative lens element has $r_6 = -154$, $d_4 = 13$, $n_d = 1.755201$ and $v_d = 27.58$;
a third lens of said second negative lens element has $r_7 = +72$, $d_5 = 3$, $n_d = 1.620411$, $v_d = 60.23$ and $l_3 = 19$;
said meniscus lens of said third negative lens element has $r_8 = -190$, $r_9 = 86$, $d_6 = 6$, $n_d = 1.755201$ and $v_d = 27.58$; and
the other lens of said third negative lens element has $r_{10} = +178$, $d_7 = 3$, $n_d = 1.620411$ and $v_d = 60.23$; in which
$r_1$, $r_2$, $r_3$, $r_4$, $r_5$, $r_6$, $r_7$, $r_8$, $r_9$ and $r_{10}$ are radii of the respective lens measured in millimeters,
$d_1$, $d_2$, $d_3$, $d_4$, $d_5$, $d_6$ and $d_7$ are lens thicknesses in millimeters,
$n_d$ is refractive index,
$v_d$ is an Abbe number,
$l_2$ is spacing between said first positive lens element and said second negative lens element in millimeters, and
$l_3$ is spacing between said second negative lens element and said third negative lens element in millimeters.

15. A lens system for an optical device projecting stereoscopic, linear anamorphotically compressed pairs of images on to a spherically curved wide screen surface, comprising:
- first and second prism pairs separated by a variable distance, at least one of said prism pairs being pivotable about a fulcrum;
- a first positive lens element including two lenses fixedly coupled together and being biconvex and concave/convex in light passage order;
- a second negative lens element including three lenses fixedly coupled together and being biconcave, biconvex and biconcave in light passage order; and
- a third negative lens element including a meniscus lens and a lens being concave/convex and biconcave in light passage order.

16. A lens system according to claim 15 wherein
said first prism pair is achromatic, has a refracting angle of 14°, and comprises first and second, fixedly connected partial prisms, said first partial prism having a refractive index $n_d = 1.622801$ and an Abbe number $v_d = 56.90$, said second partial prism having a refractive index $n_d = 1.620040$ and an Abbe number $v_d = 36.37$; and
said second prism pair is achromatic, has a refracting angle of 17° and comprises third and fourth, fixedly connected partial prisms, said third partial prism having a refractive index $n_d = 1.622801$ and an Abbe number $v_d = 56.90$, said fourth partial prism having a refracting index $n_d = 1.620040$ and an Abbe number $v_d = 36.37$.

17. A lens system according to claim 15 wherein
one lens of said first positive lens element has $r_1 = +89.05$, $r_2 = -80.50$, $d_1 = 18$, $n_d = 1.620411$ and $v_d = 60.23$;
the other lens of said first positive lens element has $r_3 = -260.50$, $d_2 = 2.3$, $n_d = 1.755201$, $v_d = 27.58$ and $l_2 = 31$;
a first lens of said second negative lens element has $r_4 = -90$, $r_5 = +154$, $d_3 = 3$, $n_d = 1.620411$ and $v_d = 60.23$;
a second lens of said second negative lens element has $r_6 = -154$, $d_4 = 13$, $n_d = 1.755201$ and $v_d = 27.58$;
a third lens of said second negative lens element has $r_7 = +72$, $d_5 = 3$, $n_d = 1.620411$, $v_d = 60.23$ and $l_3 = 19$;

said meniscus lens of said third negative lens element has $r_8 = -190$, $r_9 = 86$, $d_6 = 6$, $n_d = 1.755201$ and $v_d = 27.58$; and the other lens of said third negative lens element has $r_{10} = +178$, $d_7 = 3$, $n_d = 1.620411$ and $v_d = 60.23$; in which $r_1$, $r_2$, $r_3$, $r_4$, $r_5$, $r_6$, $r_7$, $r_8$, $r_9$ and $r_{10}$ are radii of the respective lens measured in millimeters, $d_1$, $d_2$, $d_3$, $d_4$, $d_5$, $d_6$ and $d_7$ are lens thicknesses in millimeters, $n_d$ is refractive index, $v_d$ is an Abbe number, $l_2$ is spacing between said first positive lens element and said second negative lens element in millimeters, and $l_3$ is spacing between said negative lens element and said third negative lens element in millimeters.

18. A lens system according to claim 17 wherein said first prism pair is achromatic, has a refracting angle of 14°, and comprises first and second, fixedly connected partial prisms, said first partial prism having a refractive index $n_d = 1.622801$ and an Abbe number $v_d = 56.90$, said second partial prism having a refractive index $n_d = 1.620040$ and an Abbe number $v_d = 36.37$; and said second prism pair is achromatic, has a refracting angle of 17° and comprises third and fourth, fixedly connected partial prisms, said third partial prism having a refractive index $n_d = 1.622801$ and an Abbe number $v_d = 56.90$, said fourth partial prism having a refracting index $n_d = 1.620040$ and an Abbe number $v_d = 36.37$.

* * * * *